United States Patent [19]

Cherubini et al.

[11] Patent Number: 5,455,843
[45] Date of Patent: Oct. 3, 1995

[54] ADAPTIVE EQUALIZING APPARATUS AND METHOD FOR TOKEN RING TRANSMISSION SYSTEMS USING UNSHIELDED TWISTED PAIR CABLES

[75] Inventors: Giovanni Cherubini, Rueschlikon; Sedat Oelcer, Au/ZH; Gottfried Ungerboeck, Langnau am Albis, all of Switzerland

[73] Assignee: International Business Machines Corporation, Armonk, N.Y.

[21] Appl. No.: 122,259

[22] Filed: Sep. 15, 1993

[30] Foreign Application Priority Data

Oct. 15, 1992 [EP] European Pat. Off. .............. 92810791

[51] Int. Cl.$^6$ .............................. H03H 7/30; H03H 7/40
[52] U.S. Cl. ..................... 375/230; 375/219; 375/257; 375/350; 379/398; 379/400; 379/411; 379/416; 370/6; 333/18; 333/28 R
[58] Field of Search ..................... 375/11–16, 99, 375/103, 257, 219, 220; 379/394, 398, 400, 410, 417, 399, 401, 406, 411, 416; 370/6; 333/18, 28 R; 364/724.19, 724.2

[56] References Cited

U.S. PATENT DOCUMENTS

| | | | |
|---|---|---|---|
| 4,151,490 | 4/1979 | Bazin | 333/16 |
| 4,201,959 | 6/1980 | Niiro et al. | 333/16 |
| 4,303,896 | 12/1981 | Slabinski | 333/28 R |
| 4,583,235 | 4/1986 | Dömer et al. | 375/11 |
| 5,271,037 | 12/1993 | Szechenyi | 375/14 |

FOREIGN PATENT DOCUMENTS

| | | | |
|---|---|---|---|
| 9205511 | 4/1992 | WIPO | G06G 7/02 |

OTHER PUBLICATIONS

Data Communications, vol. 19, No. 12, Sep. 21, 1990, pp. 41,42,44,46,48,50.

Data Communication, vol. 19, No. 8, Jun. 21, 1990, pp. 85,86,88,89.

IBM TDB vol. 32, No. 6A Nov. 1989 pp. 273–274.

*Primary Examiner*—Stephen Chin
*Assistant Examiner*—Amanda Le
*Attorney, Agent, or Firm*—Jerry W. Herndon

[57] ABSTRACT

Adaptive analog equalizer permitting 16 Mbit/s token ring (TR) transmission over unshielded twisted-pair (UTP) cables. The equalizer (29) is located at the wiring concentrator (25), and consists of a variable and a fixed filter section. The existing TR receiver (49) and transmitter (53) remain unchanged. To compensate for distortion introduced by the cable section (19b) preceding the equalizer, the level of the signal (B) at the equalizer output (35) is used as a control criterion. The additional distortion contributed by the cable section (21a) following the equalizer is accounted for by measuring the level of the signal (D) received from the transmitter (53) of the next TR station. By these two measurements, the equalizer is adjusted such that the cable-length dependent distortion is eliminated at the next receiver (49). Transmitted Manchester-coded signals are received essentially distortion-free for cable attenuation ranging between 0 and 25 dB at 16 MHz, corresponding to zero and maximum cable lengths between TR stations. The amplification provided by equalization at the concentrator significantly mitigates also the effect of near-end crosstalk from the transmitter into the receiver input of TR stations.

7 Claims, 2 Drawing Sheets

ADAPTIVE EQUALIZING APPARATUS AND METHOD FOR TOKEN RING TRANSMISSION SYSTEMS USING UNSHIELDED TWISTED PAIR CABLES

FIELD OF INVENTION

Present invention is concerned with an equalization scheme for token ring (TR) systems using unshielded twisted pair (UTP) cables for connecting data transmission systems (stations).

BACKGROUND

Unshielded twisted-pair (UTP) cables are becoming the preferred transmission medium for local area networks (LANs). The LAN industry is strongly interested in solutions that permit the use of UTP cables for token ring (TR) systems currently requiring shielded twisted pair cables (STP).

In TR systems, the distance between a wiring concentrator and TR stations attached to it is typically limited to 100 m. Therefore, the maximum cable length between two successive stations is 200 m. The attenuation of UTP cables is in the range of 10 ... 13 dB/100 m at 16 MHz, where the spectral peak of Manchester-coded signals occurs. For the systems considered, it is assumed that cable attenuation varies between 0 and 25 dB at 16 MHz.

To solve the equalization problem, it has been proposed to use fixed filters for compromise equalization. However, for minimal and maximal cable lengths, significant residual signal distortion will still occur with this approach and degrade the noise margin for signal detection. Insufficient equalization also increases timing jitter due to variations of the zero crossings in the received signal.

It has also been suggested to use line build-out equalizers, cf. A. Rosenblatt, "Technology '91: Data Communications", IEEE Spectrum, pp. 48–51, Vol. 28, No. 1, Jan. 1991. These equalizers can be understood as a combination of a variable-length cable simulator and an appropriate fixed filter, located at the receiver front-end of a data transmission system. A single control parameter is adjusted such that a given output signal level is obtained. The combined lengths of the actual cable and the simulated cable add up to a known cable length for which the overall channel is equalized.

OBJECTS OF THE INVENTION

It would be desirable to locate the equalizers at wiring concentrators in a TR system because (a) existing TR transceivers could remain unchanged, and (b) near-end cross-talk from the transmitter output to the receiver input of TR stations would be mitigated.

However, when the equalizers are placed at the wiring concentrators, it will be necessary to take into account the two cable sections (extension loop lines) between two successive stations, which cables in principle have unknown lengths.

Present invention suggests a solution which allows placing the equalizer at the wiring concentrator and still achieves equalization of cable-length dependent distortions.

SUMMARY OF THE INVENTION

An equalizer is provided for each extension loop at the wiring concentrator.

To compensate for distortion introduced by the cable section preceding the equalizer, the signal level at the equalizer output is used for control purposes. The additional distortion contributed by the cable section following the equalizer is accounted for by measuring the level of the signal received from the transmitter of the next TR station. Using these two measurements, the equalizer is adjusted such that cable-length dependent distortion is eliminated at the receiver of the next TR station.

The equalizer is controlled by a control signal compensating for the length "l1" from the preceding TR station to the concentrator, and for the length "l1" of the cable from the concentrator to the next TR station. The compensation for the first length "l1" is accomplished in a closed loop fashion using the signal level at the equalizer output to adjust the equalizer. The additional distortion by the cable section of the second length "l2" is compensated for by introducing in the control loop an offset signal which is determined from the level of the signal received from the next TR station.

ADVANTAGES

The equalization scheme of the present invention requires no modification of receivers in already existing TR stations. The distortion is eliminated despite unknown lengths of cables between successive TR stations. The amplification provided by equalization at the concentrator significantly mitigates the effect of near-end cross-talk from the transmitter output into the receiver input of TR stations. A transmitted Manchester-coded signal is received essentially distortion-free for cable attenuation ranging between 0 and 25 dB at 16 MHz, corresponding to zero and maximum cable length between TR stations.

LIST OF DRAWINGS

A preferred embodiment of the invention is described below with reference to the following drawings.

Figure 1:
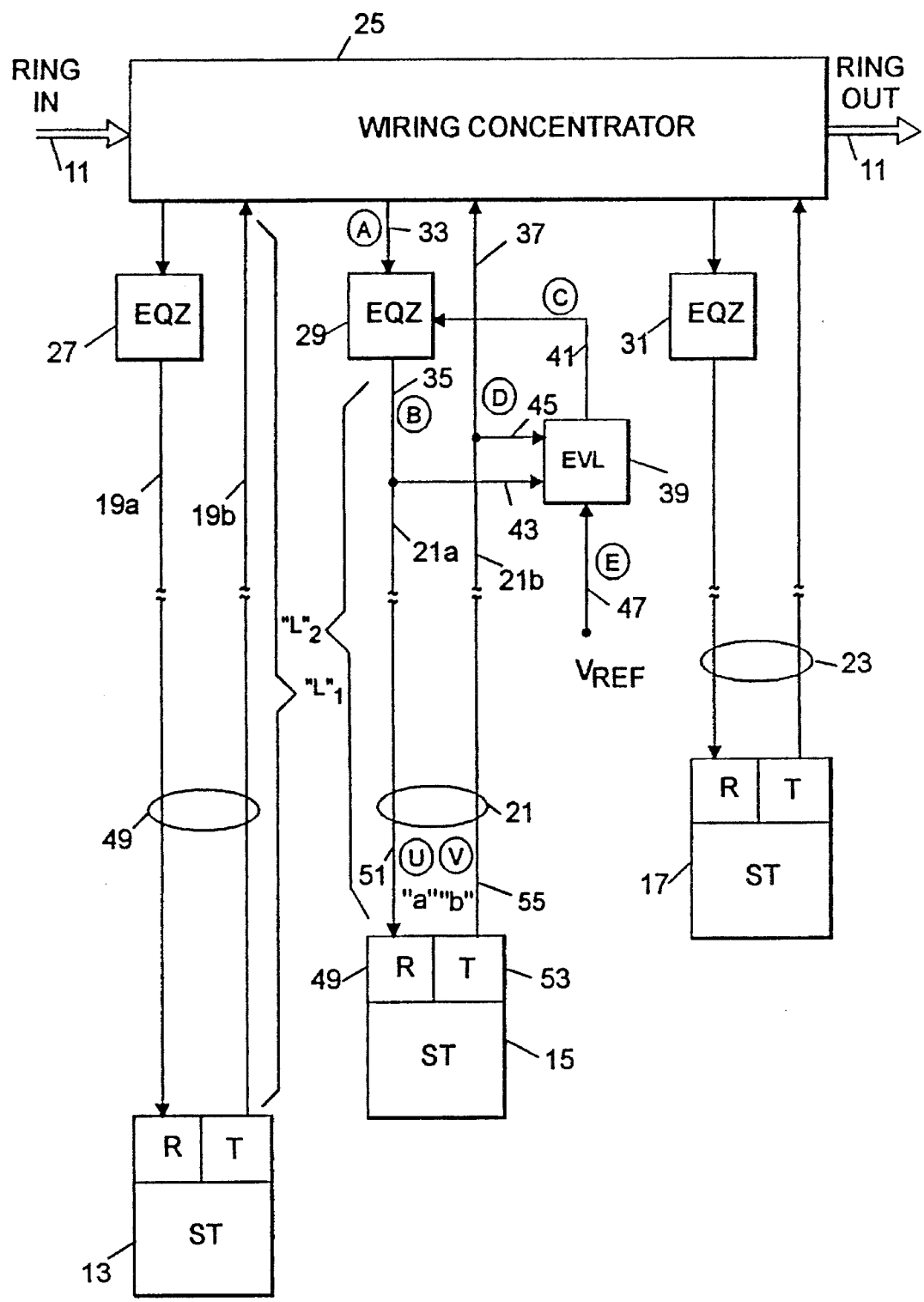
FIG. 1 is a schematic representation of the inventive equalization scheme in a token ring system where stations are attached to the transmission ring at the wiring concentrators by extension loops of unknown lengths.

DETAILED DESCRIPTION (1) Principle of Invention:

FIG. 1 is a schematic representation of a portion of a token ring network and illustrates the employed equalization concept.

To a transmission ring 11, several stations 13, 15, 17 are attached via extension loops 19, 21, 23, respectively. As usual in many TR systems, the extension loops for the stations are connected to the basic ring at a wiring concentrator 25. For each of the stations (i.e. for each of the extension loops) there is provided an equalizer (EQZ) 27, 29, 31, respectively.

To simplify the representation, further details are shown for one of the units only, i.e. for station 15 and extension loop 21 with equalizer 29, shown in the middle of FIG. 1. It should be understood that these details will be available for each station and extension loop. Equalizer 29 is connected at point 33 to the wiring concentrator and from there it receives an input signal A. The extension loop 21 consists of an outgoing extension loop line 21a, and of an incoming extension loop line 21b. The out-going extension loop line 21a is connected to equalizer output 35 where signal B is available, and leads to the receiver input of station 15. The incoming extension loop line 21b which begins at the transmitter output of station 15 is connected to the wiring concentrator at point 37 where signal D appears. For adapting the equalizer, evaluation means 39 is provided which generates a control signal C on line 41 for the equalizer. This evaluation means has two inputs: one is connected by a line 43 to the equalizer output 35 to receive signal B, and the other input is connected by a line 45 to point 37 to receive signal D. Evaluation means 39 also receives a reference signal E on an input line 47.

Station 15 comprises a receiver (R) 49 with input point 51 where input signal U appears, and further comprises a transmitter (T) 53 with output point 55 where output signal V appears. It is assumed that each TR station requires for the input signal U a predetermined power level "a", and delivers the output signal V at a predetermined power level "b". The power levels "a" and "b" are usually measured in dB.

The cable lengths "I1" and "I2" (which are the length of extension loop line 19b preceding the equalizer, and the length of extension loop line 21a following the equalizer, respectively) are to be understood as "electrical" lengths, measured in dB of attenuation at f=16 MHz. The equalizer has to compensate for the attenuations "I1" and "I2".

Operation

Compensating for "I1" is achieved as follows: Assuming a zero length for extension loop 21 (i.e. direct connection of station 15 to the equalizer), the equalizer output signal has to be kept at signal level "a". This is done by using equalizer output signal B as indicator signal in a feedback loop, such that signal B is kept at power level "a". This power level is maintained despite the unknown attenuation "I1" of the preceding loop line. Thus, the feedback control derived from signal B allows to compensate for the influence of unknown loop-line length "I1".

Compensating for "I2" is achieved as follows: if "I2" is nonzero, the equalizer output signal B has to be boosted by "I2" so that at the station receiver input the required power level "a" is available. As the length of loop "I2" is also not known, signal D is taken as an indicator signal representing the power level "b" of the station transmitter output, attenuated by "I2". This signal is now used for introducing in the control loop an offset which compensates for the loss corresponding to "I2".

Figure 2:
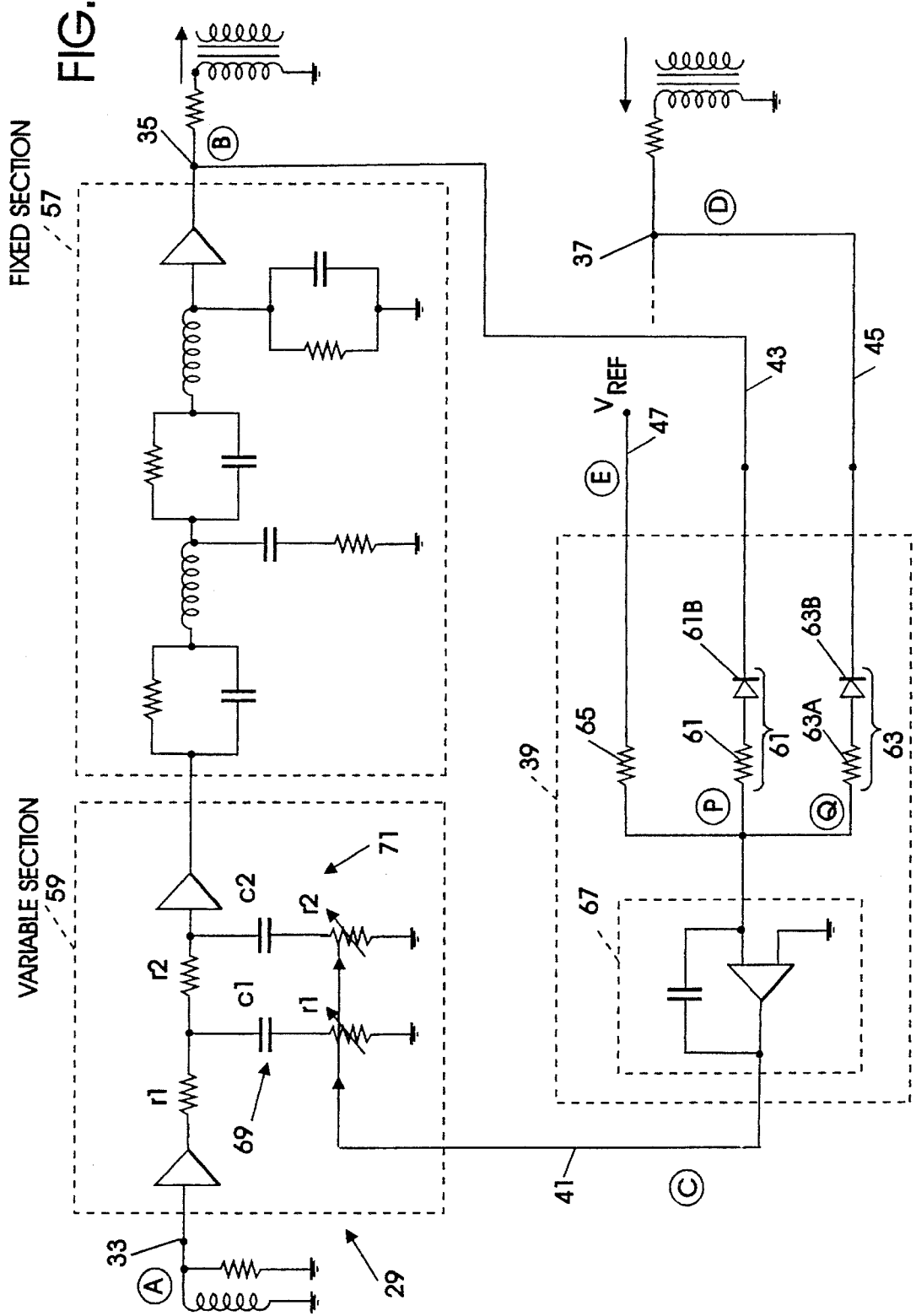
FIG. 2 shows details of an equalizer implementing the inventive concept as illustrated in FIG. 1.

(2) Details of Equalizer and Evaluation Means:

FIG. 2 shows details of an implementation of equalizer 29 and evaluation means 39 which generates the control signal C for the equalizer.

The equalizer comprises a conventional fixed filter section 57, and a variable filter section 59 of which details are described in the following. As already shown in FIG. 1, equalizer 29 receives signal A from point 33 of the wiring concentrator, and furnishes at its output 35 the signal B for transmission on extension loop line 21a.

Evaluation means 39 receives, as already shown in FIG. 1, signal B on line 43, signal D on line 45, and the reference signal E ($V_{REF}$) on line 47, and combines them to generate control signal C on line 41. Reference signal E ($V_{REF}$) represents a combination of the power levels "a" and "b". For evaluating signal B, circuitry 61 is provided which consists of a resistor 61a and a decoupling diode 61b. This circuitry or evaluation means 61 furnishes at its output a partial control signal P which depends on the power level of signal B. Similarly, for evaluating signal D, circuitry 63 is provided which consists of a resistor 63a and a decoupling diode 63b. This circuitry or deriving means 63 furnishes at its output another partial control signal Q which depends on the power level of signal D. Partial control signals P and Q, and-through resistor 65-the reference signal E which represents a combination of the power levels "a" and "b" are together furnished to circuitry 67 which in turn furnishes at its output on line 41 the control signal C.

The resistor/diode components 61 and 63 convert the voltage signals B and D, respectively, into current signals P and Q which represent the approximate power levels of the signals B and D. Resistor 65 converts the reference voltage E into a current signal which represents the negative of the sum of the desired power levels "a" and "b" in FIG. 1 at the station receiver input and transmitter output, respectively. The wires carrying these three currents are connected into a single line on which the sum of them is presented as an input signal to amplifier 67. Amplifier 67 is arranged by its capacitor shunting the amplifier input and output to perform as an integrating operational amplifier that furnishes on its output line the required control signal C.

In the equalizer variable section 59, there are provided filter circuits 69 and 71 which determine the frequency characteristics of the equalizer. Each of these circuits is a series connection of a capacitor (C1, C2) and a variable resistor (r1, r2) connected to a fixed resistor (R1, R2), respectively. The resistance value of each of the variable resistors r1 and r2 is controlled by the control signal C, thus determining the gain and frequency characteristics of the equalizer. As a result, the desired power level for the output signal B is obtained. When two filter circuits 69 and 71 are provided, better signal shaping is achieved than in the case where only one such variable filter circuit is provided.

The variable section 59 of the equalizer 29 amplifies the received data signal (a) non-uniformly over the transmitted frequency range to compensate for the length and frequency dependent characteristics of the loop lines. Filter circuits 69 and 71 do not each operate on a single frequency, but rather have the effect of varying, in dependence on control signal C, the amplification of signal A for the whole required frequency range.

A detailed description of the frequency-dependent behavior of these circuits is given in Section (3) "Design of Fixed and Variable Equalizer Sections". The term "r(I)" in Equation (1) represents the value of the variable resistors in circuits 69 and 71. The term I represents the extension loop lines for which the respective equalizer is provided. These extension loop lines and the variable section of the equalizer together provide a nearly fixed transfer function, represented in Equation (1) by the term "G-sub-CA (f,I) G-sub-VEQ [f, r(I)]". Hence, compensation over the whole required frequency range is obtained.

This variable section 59 is continuously adapted to the present situation as the section operates on the random data being transmitted in the system. There is no application of a pilot signal for setting the section parameters at specific instants of time when the pilot signal is transmitted.

The fixed section 57 of the equalizer is a simple RCC ladder network shaping the output signal (B) to a desired overall characteristic. This fixed section 57 is designed according to the optimization steps defined in Section (3) such that intersymbol interference is minimized and well defined zero crossings are obtained.

Component values for the equalizer 29 and the evaluation means 39, and the reference voltage E are so selected that the following is achieved:

When the power level of signal D is approximately equal to "b", i.e. the nominal level of the station transmitter output signal (which would be the case when "I2" is zero), then the power level of signal B is kept at value "a", the nominal level of the station receiver input signal (which would be required when "I2" is zero).

If the approximate power level of signal D is less than "b" by an amount "I2", the power level of signal B is increased to a value "a"+"I2".

(3) Design of Fixed and Variable Equalizer Sections:

Step 1: Determine by appropriate measurements the elementary pulse signals $h_T(t)$ and $h_{TR}(t)$ obtained in response to a transmitted symbol $a_0=+1$ (rectangular pulse of duration T) at the output of the transmitter, and at the detection point of the receiver with zero cable length between transmitter and receiver, respectively. Then compute the Fourier transforms thereof: $H_T(f)$, $H_{TR}(f)$.

Reference is made to $$G_T(f) = \frac{1}{T} H_T(f), \quad G_R(f) = \frac{H_{TR}(f)}{H_T(f)}$$

as the transfer functions of the transmitter and the receiver, respectively.

Step 2: Design the variable equalizer section for the desired range of cable attenuations. The residual distortion for a given cable length l is defined as $$D^2(l) = \int_{-1/2T}^{1/2T} \Phi_{aa}(f) |\gamma_0(f) G_{CA}(f,l) G_{VEQ}[f,r(l)] e^{j2\pi f \tau(l)} - 1|^2 df \quad (1)$$

$$\triangleq \int_{-1/2T}^{1/2T} \Phi_{aa}(f) |\gamma_0(f) G_{VA}(f,l) - 1|^2 df,$$

where $\Phi_{aa}(f)$ is the power spectral density of the sequence of transmitted symbols $\{a_n\}$, $\gamma_0(f)$ is a constant transfer function, $r(l)=r1=r2$, $G_{CA}(f,l)$ is the transfer function of the variable equalizer section, and $\tau(l)$ is a delay included for best adjustment of the sampling phase. The average distortion $D^2$ is considered to be defined over a finite number n of cable lengths $l_i$, $i=0, \ldots, n-1$, i.e., $$\overline{D}^2 = \sum_{i=0}^{n-1} \frac{1}{n} D^2(l_i). \quad (2)$$

Minimization of $\overline{D}^2$ with respect to $\gamma_0(f)$ leads to $$\overline{D}^2_{min} = \int_{-1/2T}^{1/2T} \Phi_{aa}(f) \left[ 1 - \frac{\left|\sum_{i=0}^{n-1} G_{VA}(f,l_i)\right|^2}{n \sum_{i=0}^{n-1} |G_{VA}(f,l_i)|^2} \right] df. \quad (3)$$

Thus, $\gamma_0(f)$ has been eliminated.

$\overline{D}^2_{min}$ is now regarded as a function of the fixed component values R1, C1, R2, C2 and tile variable resistor values r1, r2 of the variable equalizer section 59 depicted in FIG. 2. In addition, $\overline{D}^2_{min}$ depends also on the delay values $\tau(l_i)$. The optimum parameter values are determined by minimizing $\overline{D}^2_{min}$ using a numerical optimization method, e.g., simulated annealing.

Step 3: Compute the ideal transfer function $$G_{FEQ,ideal}(f) = \frac{1 + \cos(\pi f T)}{2 G_T(f) G_{CA}(f,l_{max}/2) G_{VEQ}[f,r_E(l_{max}/2)] G_R(f)}, \quad (4)$$

$$|f| \leq \frac{1}{T}.$$

From $G_{FEQ,ideal}(f)$ determine a suitable filter structure.

Step 4: Optimize component values in the fixed equalizer section with transfer function $G_{FEQ}(f)$ by minimizing $$\overline{\varepsilon}^2 = \frac{1}{n} \sum_{i=0}^{n-1} \int_{1/T}^{-1/T} \Phi_{aa}(f) \left| G_{overall}(f) e^{j2\pi f \tau(l_1)} - \frac{1 + \cos(\pi f T)}{2} \right|^2 df, \quad (5)$$

where $$G_{overall}(f,l_i) = G_T(f) G_{CA}(f,l_i) G_{VEQ}[f,r_E(l_i)] G_{FEQ}(f) G_R(f) \quad (6)$$

In (5), a new set of optimum time delays $\tau(l_i)$ is allowed.

Step 5: Select the reference voltage $V_{REF}$ and the fixed resistors 61a and 63a so that, for "I2"0, the resulting control voltage (C) sets the variable resistors r1 and r2 to identical values, causing the power level of the equalizer output signal (B) to assume a predetermined value ("a").

We claim:

1. Adaptive equalizer arrangement for a transmission network comprising a unidirectional transmission medium (11) to which a plurality of stations (13, 15, 17) are attached, each station being connected to the transmission medium by an extension loop (19, 21, 23) comprising an outgoing extension loop line (21a) and an incoming extension loop line (21b) which are interconnected with the transmission medium at a wiring concentrator (25), comprising for each extension loop:

an adaptive equalizer means (29) connected at the wiring concentrator between the incoming extension loop line of a first station and the outgoing extension loop line to the next station along the unidirectional transmission medium, means (43) connected to said outgoing extension loop line at the equalizer output (35) for obtaining a first indicator signal (B) indicative of the power level of signals received at the concentrator from the incoming extension loop line of the first station, means (45) connected to the respective incoming extension loop line (21b) of said next station at the wiring concentrator for obtaining a second indicator signal (D) from the incoming extension loop line from said next station, means (47) for providing a predetermined reference signal (E) representing prescribed signal power levels at the input (51) and output (55), respectively, of each station (15), and evaluation means (39) for combining said first and second indicator signals and said reference signal, and for generating and applying an adaptive control signal (C) to said equalizer means, such that attenuation which is dependent on the lengths of the incoming extension loop line of the first station and the outgoing extension loop line of said next station is compensated.

2. Equalizer arrangement according to claim 1, wherein said evaluation means (39) includes:

first deriving means (61) for deriving from said first indicator signal (B) a first partial control signal (P)

approximately representing the power level of said first indicator signal, second deriving means (63) for deriving from said second indicator signal (D) a second partial control signal (Q) approximately representing the power level of said second indicator signal, the outputs of said first and second deriving means and said reference signal providing means (47) being interconnected for producing on a single control line (41) said adaptive control signal (C) for said equalizer means (29).

3. Equalizer arrangement according to claim 2, wherein said first and second deriving means (61, 63) each are a series connection of a resistor (61a, 63a) and a decoupling diode (61b, 63b).

4. Equalizer arrangement according to claim 1 or 2, wherein said equalizer means (29) comprises at least one controllable filter circuit (69, 71), each said controllable filter circuit including a series connection of a capacitor (C1, C2) and an adjustable resistor (r1, r2), said adjustable resistor being connected to said control line (41) so that its resistance value is set by said control signal (C).

5. Equalizer arrangement according to claim 4, wherein a pair of said controllable filter circuits (69, 71) is provided which are both connected to said control line (41) so that their adjustable resistors (r1, r2) are both controlled by the same control signal (C).

6. In a communication system comprising a unidirectional transmission medium (11) and a plurality of stations (13, 15, 17) each connected to the transmission medium by an extension loop (19, 21, 23) including an outgoing extension loop line (21a) and an incoming extension loop line (21b), an equalizer (29) being connected between the transmission medium (11) and the outgoing extension loop line (21a) of a first station, a method for adapting the equalizer to compensate for the length-dependent attenuation caused by extension loop lines, the method comprising the steps of:

obtaining a first indicator signal (B) from the output (35) of said equalizer representing the power level of signals received at the concentrator from the incoming extension loop line of the station immediately preceding said first station along the unidirectional transmission medium, obtaining a second indicator signal (D) from the respective incoming extension loop line (21b) of said first station where it is connected (35) to said transmission medium, providing a reference signal (E) representing a combination of prescribed power levels of the input and output signals (U, V) of each station (13, 15 17), and combining said first and second indicator signals and said reference signal, to generate an adaptive control signal (C) for said equalizer such that signal attenuation caused by the incoming extension loop line of said station immediately preceding the first station and the outgoing extension loop line of the first station is compensated.

7. Method according to claim 6, wherein said combining step includes:

generating a first partial control signal current (P) representing the approximate power level of said first indicator signal (B), generating a second partial control signal current (Q) representing the approximate power level of said second indicator signal (D), and adding said first and second partial control signal currents and a current resulting from said reference signal (E), to obtain said adaptive control signal (C).

* * * * *